US 12,457,318 B2

United States Patent
Atkins

(10) Patent No.: US 12,457,318 B2
(45) Date of Patent: Oct. 28, 2025

(54) METHOD, ENCODER, AND DISPLAY DEVICE FOR REPRESENTING A THREE-DIMENSIONAL SCENE AND DEPTH-PLANE DATA THEREOF

(71) Applicant: DOLBY LABORATORIES LICENSING CORPORATION, San Francisco, CA (US)

(72) Inventor: Robin Atkins, Vancouver (CA)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 103 days.

(21) Appl. No.: 18/566,032

(22) PCT Filed: Jun. 2, 2022

(86) PCT No.: PCT/US2022/031915
§ 371 (c)(1),
(2) Date: Nov. 30, 2023

(87) PCT Pub. No.: WO2022/256497
PCT Pub. Date: Dec. 8, 2022

(65) Prior Publication Data
US 2024/0291957 A1    Aug. 29, 2024

Related U.S. Application Data

(60) Provisional application No. 63/195,898, filed on Jun. 2, 2021.

(30) Foreign Application Priority Data

Jun. 2, 2021    (EP) ..................... 21177381

(51) Int. Cl.
*H04N 13/395*    (2018.01)
*G06T 5/50*    (2006.01)
(Continued)

(52) U.S. Cl.
CPC ............. *H04N 13/395* (2018.05); *G06T 5/50* (2013.01); *H04N 13/351* (2018.05); *G06T 2207/20216* (2013.01); *H04N 2013/0081* (2013.01)

(58) Field of Classification Search
CPC ............... H04N 13/395; H04N 13/351; H04N 2013/0081; G06T 5/50; G06T 2207/20216
See application file for complete search history.

(56) References Cited

U.S. PATENT DOCUMENTS 5,726,704 A * 3/1998 Uomori ................ H04N 13/239
348/E13.052
5,973,700 A * 10/1999 Taylor .................. H04N 13/221
348/E13.043
(Continued)

FOREIGN PATENT DOCUMENTS

CN    112509151 A    3/2021
WO    2019138163 A1    7/2019
(Continued)

OTHER PUBLICATIONS

Y. Yang, C. Lu, J. Li and H. Yao, "Just Noticeable Depth Difference of Human during Viewing of Dynamic Random Dot Stereograms," 2016 9th International Symposium on Computational Intelligence and Design (ISCID), Hangzhou, China, 2016, pp. 422-424, doi: 10.1109/ISCID.2016.1104. (Year: 2016).*
(Continued)

*Primary Examiner* — Charles L Beard

(57) ABSTRACT

A method for representing a three-dimensional scene stored as a three-dimensional data set includes determining a set of P depth-plane depths along a viewing direction. The method includes generating, from a three-dimensional data set, a proxy three-dimensional data set including Pproxy images by, for each depth-plane depth: generating a proxy image of
(Continued)

the Pproxy images from at least one cross-sectional image of a plurality of transverse cross-sectional images that (i) constitute the three-dimensional data set and (ii) each represent a respective transverse cross-section of the three-dimensional scene at a respective scene-depth.

15 Claims, 7 Drawing Sheets

(51) Int. Cl.
*H04N 13/351* (2018.01)
*H04N 13/00* (2018.01)

(56) References Cited

U.S. PATENT DOCUMENTS

| | | | | |
|---|---|---|---|---|
| 6,224,214 | B1* | 5/2001 | Martin | H04N 13/296 |
| | | | | 348/E13.058 |
| 6,741,244 | B1* | 5/2004 | Czuchry, Sr. | G06T 15/20 |
| | | | | 345/441 |
| 6,791,541 | B1* | 9/2004 | Czuchry, Sr. | G03B 35/24 |
| | | | | 359/619 |
| 7,027,659 | B1* | 4/2006 | Thomas | H04N 13/395 |
| | | | | 348/E13.013 |
| 8,330,802 | B2* | 12/2012 | Koppal | H04N 13/10 |
| | | | | 348/46 |
| 8,708,498 | B2* | 4/2014 | Sasaki | G06V 40/19 |
| | | | | 353/13 |
| 8,749,547 | B2* | 6/2014 | Oto | H04N 13/279 |
| | | | | 345/419 |
| 8,928,654 | B2* | 1/2015 | Givon | H04N 13/111 |
| | | | | 348/46 |
| 9,055,277 | B2* | 6/2015 | Katayama | H04N 13/128 |
| 9,215,436 | B2* | 12/2015 | Welsh | H04N 13/156 |
| 9,355,455 | B2* | 5/2016 | An | H04N 13/128 |
| 9,497,380 | B1* | 11/2016 | Jannard | H04N 23/90 |
| 9,521,418 | B2* | 12/2016 | Chen | H04N 19/44 |
| 9,571,812 | B2* | 2/2017 | Smolic | H04N 19/70 |
| 9,635,348 | B2* | 4/2017 | McNamer | H04N 13/221 |
| 9,672,446 | B1* | 6/2017 | Vallespi-Gonzalez | |
| | | | | H04N 13/239 |
| 9,754,379 | B2* | 9/2017 | Ma | G06T 7/60 |
| 9,930,363 | B2 | 3/2018 | Rusanovskyy | |
| 10,482,586 | B2 | 11/2019 | Aflaki Beni | |
| 10,609,372 | B2 | 3/2020 | Su | |
| 10,652,579 | B2 | 5/2020 | Lakshman | |
| 10,679,582 | B2* | 6/2020 | Ninan | H04N 5/202 |
| 10,735,743 | B2 | 8/2020 | Kwon | |
| 10,783,668 | B2 | 9/2020 | Sinharoy | |
| 10,791,299 | B2 | 9/2020 | Zhang | |
| 11,138,793 | B2* | 10/2021 | Samec | H04N 13/128 |
| 11,206,364 | B1* | 12/2021 | Price | G02B 27/0172 |
| 12,182,945 | B2* | 12/2024 | Samec | H04N 13/383 |
| 12,326,570 | B2* | 6/2025 | Ninan | G02C 7/08 |
| 2010/0238366 | A1* | 9/2010 | Chang | H04N 13/376 |
| | | | | 345/5 |
| 2010/0272417 | A1* | 10/2010 | Nagasawa | H04N 13/183 |
| | | | | 386/239 |
| 2011/0050864 | A1* | 3/2011 | Bond | H04N 13/261 |
| | | | | 348/42 |
| 2011/0080466 | A1* | 4/2011 | Kask | H04N 13/139 |
| | | | | 348/E13.001 |
| 2011/0110583 | A1* | 5/2011 | Zhang | G06T 7/579 |
| | | | | 382/154 |
| 2011/0285701 | A1* | 11/2011 | Chen | G06T 7/97 |
| | | | | 345/506 |
| 2011/0304708 | A1* | 12/2011 | Ignatov | H04N 13/128 |
| | | | | 348/51 |
| 2012/0038641 | A1* | 2/2012 | Levantovsky | H04N 13/183 |
| | | | | 345/424 |
| 2012/0038754 | A1* | 2/2012 | Na | H04N 13/341 |
| | | | | 348/51 |
| 2012/0148147 | A1* | 6/2012 | Ogata | G06T 19/00 |
| | | | | 382/154 |
| 2012/0162379 | A1* | 6/2012 | Dahi | H04N 23/6811 |
| | | | | 348/47 |
| 2012/0176371 | A1* | 7/2012 | Morifuji | G06T 7/97 |
| | | | | 382/298 |
| 2012/0236114 | A1* | 9/2012 | Chang | G06T 7/50 |
| | | | | 348/43 |
| 2012/0320155 | A1* | 12/2012 | Suh | H04N 13/128 |
| | | | | 348/51 |
| 2012/0327077 | A1* | 12/2012 | Tung | H04N 13/128 |
| | | | | 345/419 |
| 2012/0327078 | A1* | 12/2012 | Liao | G06T 7/593 |
| | | | | 345/419 |
| 2013/0038600 | A1* | 2/2013 | Wang | H04N 13/189 |
| | | | | 345/419 |
| 2013/0063576 | A1* | 3/2013 | Okubo | G02B 30/33 |
| | | | | 348/51 |
| 2013/0083163 | A1* | 4/2013 | Kwon | H04N 19/154 |
| | | | | 348/E13.064 |
| 2014/0043336 | A1* | 2/2014 | Welsh | G06T 15/08 |
| | | | | 345/427 |
| 2014/0218488 | A1* | 8/2014 | Didyk | G06T 7/97 |
| | | | | 348/51 |
| 2015/0116455 | A1* | 4/2015 | Suh | H04N 13/172 |
| | | | | 348/42 |
| 2015/0208054 | A1* | 7/2015 | Michot | H04N 13/128 |
| | | | | 348/54 |
| 2016/0050404 | A1* | 2/2016 | Bruls | H04N 13/139 |
| | | | | 348/43 |
| 2016/0148416 | A1* | 5/2016 | Wu | H04N 13/395 |
| | | | | 345/419 |
| 2016/0165216 | A1* | 6/2016 | Wu | H04N 13/282 |
| | | | | 348/223.1 |
| 2016/0219258 | A1* | 7/2016 | Woodgate | H04N 23/661 |
| 2016/0227185 | A1* | 8/2016 | Nims | H04N 13/128 |
| 2016/0260258 | A1* | 9/2016 | Lo | G02B 27/0172 |
| 2016/0275691 | A1* | 9/2016 | Domanski | G06T 7/97 |
| 2016/0309154 | A1* | 10/2016 | Rusanovskyy | H04N 19/186 |
| 2016/0343138 | A1* | 11/2016 | Chew | G06T 7/73 |
| 2017/0085867 | A1* | 3/2017 | Baran | B41M 3/008 |
| 2017/0085894 | A1* | 3/2017 | Ramasubramonian | |
| | | | | H04N 19/36 |
| 2017/0140571 | A1* | 5/2017 | Peterson | H04N 13/373 |
| 2017/0142398 | A1* | 5/2017 | Peterson | H04N 13/261 |
| 2017/0195656 | A1* | 7/2017 | Nash | G06T 7/50 |
| 2017/0199496 | A1* | 7/2017 | Grata | G02B 27/017 |
| 2017/0359561 | A1* | 12/2017 | Vallespi-Gonzalez | |
| | | | | H04N 13/239 |
| 2018/0070107 | A1* | 3/2018 | Ramasubramonian | |
| | | | | H04N 19/70 |
| 2018/0192222 | A1* | 7/2018 | De Bruijn | H04N 13/398 |
| 2018/0259782 | A1* | 9/2018 | Newton | G02F 1/1347 |
| 2018/0262758 | A1* | 9/2018 | El-Ghoroury | G02B 27/017 |
| 2018/0286105 | A1* | 10/2018 | Surti | G06T 15/10 |
| 2018/0310907 | A1* | 11/2018 | Zhang | G06F 3/0346 |
| 2018/0322818 | A1* | 11/2018 | O'Brien | G06T 15/005 |
| 2018/0359489 | A1* | 12/2018 | Lakshman | H04N 19/597 |
| 2018/0374192 | A1* | 12/2018 | Kunkel | H04N 23/58 |
| 2019/0014303 | A1* | 1/2019 | Zhu | H04N 13/271 |
| 2019/0139296 | A1* | 5/2019 | Lakshman | G06T 7/596 |
| 2019/0156553 | A1* | 5/2019 | O'Brien | H04N 13/122 |
| 2019/0171064 | A1* | 6/2019 | Newton | H04N 13/395 |
| 2019/0174125 | A1* | 6/2019 | Ninan | H04N 21/816 |
| 2019/0222823 | A1* | 7/2019 | Clagg | H04N 7/183 |
| 2019/0268612 | A1* | 8/2019 | Fukuyasu | H04N 21/234 |
| 2019/0385320 | A1* | 12/2019 | Alibay | G06T 7/521 |
| 2020/0007845 | A1* | 1/2020 | Fukuyasu | H04N 13/15 |
| 2020/0134780 | A1* | 4/2020 | Chapiro | G06F 3/013 |
| 2020/0209638 | A1* | 7/2020 | Osmanis | H04N 13/395 |
| 2020/0228836 | A1* | 7/2020 | Schwarz | H04N 13/117 |
| 2020/0265594 | A1* | 8/2020 | Aguirre-Valencia | G06F 3/011 |
| 2020/0288114 | A1* | 9/2020 | Lakshman | H04N 13/383 |
| 2020/0371378 | A1* | 11/2020 | Makinen | H04N 13/365 |
| 2020/0374504 | A1* | 11/2020 | Taylor | H04N 13/156 |
| 2021/0096380 | A1* | 4/2021 | Osmanis | H04N 13/344 |
| 2021/0133994 | A1* | 5/2021 | Valli | G02B 27/017 |

(56) References Cited

U.S. PATENT DOCUMENTS

| | | | |
|---|---|---|---|
| 2021/0185303 A1* | 6/2021 | Valli | G02B 30/52 |
| 2021/0235067 A1* | 7/2021 | Valli | H04N 13/395 |
| 2021/0289190 A1* | 9/2021 | Nims | H04N 13/302 |
| 2021/0373340 A1* | 12/2021 | DeVine | G02B 26/06 |
| 2022/0155611 A1* | 5/2022 | Ojala | G02B 27/30 |
| 2022/0197023 A1* | 6/2022 | Mihali | G06F 1/1626 |
| 2022/0256133 A1* | 8/2022 | Routhier | H04N 13/117 |
| 2022/0279183 A1* | 9/2022 | Besenbruch | G06T 3/4046 |
| 2023/0171392 A1* | 6/2023 | Hassenpflug | G06T 7/30 348/45 |
| 2024/0031543 A1* | 1/2024 | Atkins | H04N 13/376 |
| 2024/0104823 A1* | 3/2024 | Filippov | G06V 10/143 |
| 2024/0112396 A1* | 4/2024 | Spencer | G06T 7/73 |
| 2024/0114122 A1* | 4/2024 | Momonoi | H04N 13/32 |
| 2024/0118550 A1* | 4/2024 | Lai | G02B 27/0172 |
| 2024/0163476 A1* | 5/2024 | Valli | H04N 19/103 |
| 2024/0163477 A1* | 5/2024 | Valli | H04N 19/124 |
| 2024/0221344 A1* | 7/2024 | Kadambi | H04N 13/239 |
| 2024/0267507 A1* | 8/2024 | Zerega | H04N 13/351 |
| 2024/0272442 A1* | 8/2024 | Lai | G02B 27/0179 |
| 2024/0331085 A1* | 10/2024 | Valli | G06F 3/1454 |
| 2024/0406365 A1* | 12/2024 | Menzies | H04N 13/117 |
| 2024/0430395 A1* | 12/2024 | Valli | H04N 13/395 |
| 2025/0022103 A1* | 1/2025 | Niazi | G06T 5/50 |
| 2025/0063208 A1* | 2/2025 | Sundaram | H04N 19/172 |
| 2025/0106376 A1* | 3/2025 | Xiao | H04N 13/156 |
| 2025/0148699 A1* | 5/2025 | Ninan | H04N 19/27 |

FOREIGN PATENT DOCUMENTS

| | | |
|---|---|---|
| WO | 2019143688 A1 | 7/2019 |
| WO | 2019173357 A1 | 9/2019 |
| WO | 2019183211 A1 | 9/2019 |
| WO | 2020009922 A1 | 1/2020 |
| WO | 2020010018 A1 | 1/2020 |
| WO | 2020205003 A1 | 10/2020 |

OTHER PUBLICATIONS

Y. Yang, R. Zhu and C. Lu, "Depth Enhancement and Optimization for Stereo Images Based on JNDD," 2018 11th International Congress on Image and Signal Processing, BioMedical Engineering and Informatics (CISP-BMEI), Beijing, China, 2018, pp. 1-5, doi: 10.1109/CISP-BMEI.2018.8633097. (Year: 2018).*

F. Qi, T. Jiang, X. Fan, S. Ma and D. Zhao, "Stereoscopic video quality assessment based on stereo just-noticeable difference model," 2013 IEEE International Conference on Image Processing, Melbourne, VIC, Australia, 2013, pp. 34-38, doi: 10.1109/ICIP.2013.6738008. (Year: 2013).*

V. De Silva, A. Fernando, S. Worrall, H. Kodikara Arachchi and A. Kondoz, "Sensitivity Analysis of the Human Visual System for Depth Cues in Stereoscopic 3-D Displays," in IEEE Transactions on Multimedia, vol. 13, No. 3, pp. 498-506, Jun. 2011, doi: 10.1109/TMM.2011.2129500. (Year: 2011).*

S.-W. Jung, "A Modified Model of the Just Noticeable Depth Difference and Its Application to Depth Sensation Enhancement," in IEEE Transactions on Image Processing, vol. 22, No. 10, pp. 3892-3903, Oct. 2013, doi: 10.1109/TIP.2013.2263150. (Year: 2013).*

S.-W. Jung and S.-J. Ko, "Depth Sensation Enhancement Using the Just Noticeable Depth Difference," in IEEE Transactions on Image Processing, vol. 21, No. 8, pp. 3624-3637, Aug. 2012, doi: 10.1109/TIP.2012.2191569. (Year: 2012).*

C. Li, P. An, L. Shen, K. Li and N. Feng, "Just noticeable disparity difference model for 3D displays, " 2016 Visual Communications and Image Processing (VCIP), Chengdu, China, 2016, pp. 1-4, doi: 10.1109/VCIP.2016.7805447. (Year: 2016).*

Y. Fan, M.-C. Larabi, F. Alaya Cheikh and C. Fernandez-Maloigne, "A Survey of Stereoscopic 3D Just Noticeable Difference Models," in IEEE Access, vol. 7, pp. 8621-8645, 2019, doi: 10.1109/ACCESS.2018.2887276. (Year: 2019).*

Jannick P. Rolland et al: "Multifocal planes head-mounted displays", Applied Optics, vol. 39, No. 19, Jul. 1, 2000, pp. 3209 to 3215, 7 pages.

Recommendation ITU-R BT.1845 by the International Telecommunication Union, Oct. 2008, pp. 1-3, 3 pages.

* cited by examiner

700 ─┐

┌─────────────────────────────────────────────────────────────────────────────┐
│ 710                                                                         │
│ Determine a lateral offset $\Delta x$ from a visual angle $\Delta\phi$ and a predetermined minimum depth-plane depth of a │
│ quantity $P$ depth-plane depths.                                             │
└─────────────────────────────────────────────────────────────────────────────┘

┌─────────────────────────────────────────────────────────────────────────────┐
│ 720                                                                         │
│ Determine the $P$ depth-plane depths along a first viewing direction relative to a first vantage point. a │
│ separation $\Delta D$ between each proximal depth $D$ and an adjacent distal depth $(D+\Delta D)$ of the $N$ depth-plane │
│ depths being a just-noticeable difference determined by (i) the proximal depth $D$, (ii) the lateral offset $\Delta x$, │
│ and the visual angle $\Delta\phi$.                                           │
└─────────────────────────────────────────────────────────────────────────────┘

┌─────────────────────────────────────────────────────────────────────────────┐
│ 730                                                                         │
│ Generate, from the three-dimensional data set, a proxy three-dimensional data set that includes $P$ proxy │
│ images by, for each depth-plane depth of the $P$ depth-plane depths: generate a proxy image of the $P$ proxy │
│ images from at least one cross-sectional image of a plurality of transverse cross-sectional images. │
│ ┌─────────────────────────────────────────────────────────────────────────┐ │
│ │ 732                                                                     │ │
│ │ Average the multiple cross-sectional images of the plurality of transverse cross-sectional images. │ │
│ └─────────────────────────────────────────────────────────────────────────┘ │
└─────────────────────────────────────────────────────────────────────────────┘

┌─────────────────────────────────────────────────────────────────────────────┐
│ 740                                                                         │
│ Determine a respective scene depth $D'_k$ for each proxy image $I_k$ of the $P$ proxy images │
│ as a linear function of:                                                    │
│                                                                             │
│ $$\left(\frac{(k/P_d)^{1/m}-c_2}{c_1-c_3(k/P_d)^{1/m}}\right)^{1/n}$$       │
└─────────────────────────────────────────────────────────────────────────────┘

┌─────────────────────────────────────────────────────────────────────────────┐
│ 750                                                                         │
│ Display each proxy image at its respective scene depth.                     │
│ ┌─────────────────────────────────────────────────────────────────────────┐ │
│ │ 752                                                                     │ │
│ │ When steps 720 and 730 are executed by a first device: transmit the proxy three-dimensional data from │ │
│ │ the first device to a second device, which executes said determining the respective scene-depths $D_k$ and │ │
│ │ displays the proxy image.                                               │ │
│ └─────────────────────────────────────────────────────────────────────────┘ │
└─────────────────────────────────────────────────────────────────────────────┘

FIG. 7

METHOD, ENCODER, AND DISPLAY DEVICE FOR REPRESENTING A THREE-DIMENSIONAL SCENE AND DEPTH-PLANE DATA THEREOF

CROSS-REFERENCE TO RELATED APPLICATIONS

This application claims priority to U.S. Provisional Application No. 63/195,898 and European Patent Application No. 21177381.7, both filed on Jun. 2, 2021, each of which is incorporated by reference in its entirety.

BACKGROUND

Some volumetric, augmented reality, and virtual reality applications represent a three-dimensional scene as a series of images at different distances (depth planes) to a viewer of the scene. To render such a scene from a desired viewpoint, each depth plane can be processed in turn and composited with the others to simulate a two-dimensional projection of the three-dimensional scene at the desired viewer position. This two-dimensional projection can then be displayed on a head-mounted device, mobile phone, or other flat screen. By dynamically adjusting the two-dimensional projection based on the position of the viewer, the experience of being in a three-dimensional scene can be simulated.

SUMMARY OF THE EMBODIMENTS

Decreasing a number of depth planes required to accurately represent a three-dimensional scene is valuable because such a reduction decreases the amount of data that must be processed. In embodiments disclosed herein, reducing the number of depth planes is accomplished while ensuring that an accurate simulation can be rendered that meets or just exceeds the ability of the human visual system to perceive depth. Embodiments disclosed herein include a "Depth Perceptual Quantization" function or DPQ that relates physical distances in depth (depth planes) to the capabilities of the human visual system, such as visual acuity. Each depth plane calculated by the DPQ is a constant "just noticeable difference" from an adjacent plane.

In a first aspect, a method for representing a three-dimensional scene stored as a three-dimensional data set is disclosed. The method includes determining a quantity P depth-plane depths along a first viewing direction relative to a first vantage point. A separation $\Delta D$ between each proximal depth $D$ and an adjacent distal depth $(D+\Delta D)$ of the P depth-plane depths is a just-noticeable difference determined by (i) the proximal depth $D$, (ii) a lateral offset $\Delta x$, perpendicular to the first viewing direction, and between the first vantage point and a second vantage point, and (iii) a visual angle $\Delta\phi$ subtended by separation $\Delta D$ when viewed from the second vantage point. The method also includes generating, from the three-dimensional data set, a proxy three-dimensional data set that includes P proxy images $I_k$. Generating the proxy three-dimensional data set is accomplished by, for each depth-plane depth of the P depth-plane depths: generating a proxy image of the P proxy images from at least one cross-sectional image of a plurality of transverse cross-sectional images that (i) constitute the three-dimensional data set and (ii) each represent a respective transverse cross-section of the three-dimensional scene at a respective scene-depth of a plurality of scene-depths.

In a second aspect, an encoder includes a processor and a memory. The memory stores machine readable instructions that when executed by the processor, control the processor to execute the method of the first aspect.

In a third aspect, a display device includes an electronic visual display, a processor, and a memory. The memory stores machine readable instructions that when executed by the processor, control the processor to, for each proxy image $I_k$ of P proxy images, k=0, 1, ..., (P–1): (i) determine a respective scene-depth $D_k$ of proxy image $I_k$ as a linear function of $$\left(\frac{(k/P_d)^{1/m} - c_2}{c_1 - c_3(k/P_d)^{1/m}}\right)^{1/n},$$

where m, n, $c_1$, $c_2$, and $c_3$ are predetermined values and $P_d=(P-1)$, and (ii) display proxy image $I_k$ at scene depth $D_k$ on the electronic visual display.

In a fourth aspect, a method for representing depth-plane data includes, for each of a plurality of two-dimensional images each corresponding to a respective one of a plurality of depths D within a three-dimensional scene: (i) determining a normalized depth D' from the depth D; (ii) computing a normalized perceptual depth $D_{PQ}$ that equals $$\left(\frac{c_2 + c_1 D'^n}{1 + c_3 D'^n}\right)^m;$$

(iii) representing the normalized perceptual depth $D_{PQ}$ as a binary code value $D_B$, where m, n, $c_1$, $c_2$, and $c_3$ are predetermined values.

BRIEF DESCRIPTION OF THE FIGURES

FIG. 7 is a flowchart illustrating a method for representing a three-dimensional scene stored as a three-dimensional data set, in an embodiment.

DETAILED DESCRIPTION OF THE EMBODIMENTS

Devices and methods disclosed herein determine depth-plane locations based on the limits of spatial acuity (the ability to perceive fine detail). This approach differs from methods that rely on binocular acuity (the ability to perceive a different image in two eyes). By leveraging spatial acuity, embodiments disclosed herein ensure accurate representation of high-frequency occlusions that exist when one object is obscured by another from one viewing position, but is visible from another The depth-plane location methods disclosed herein consider motion parallax, which is when an observer moves when observing a scene to observe it from a different perspective. The change in the image from two different vantage points results in a strong depth cue. Other methods consider only the difference in vantage point between two eyes, typically 6.5 cm. Embodiments herein accommodate, and are designed for, a much longer baseline, such as of 28 cm of movement, which results in many more perceptual depth planes.

Figure 1:
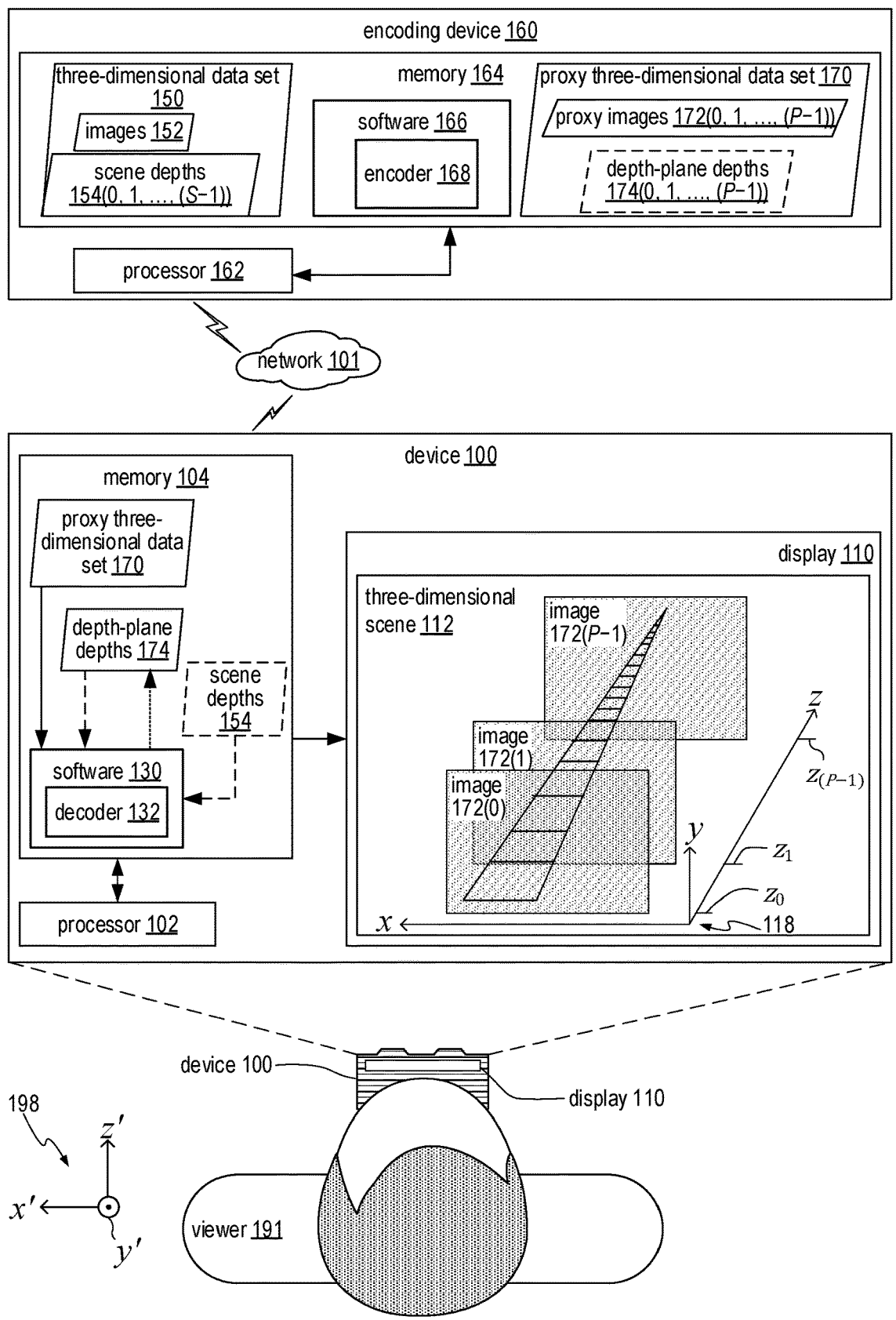
FIG. 1 is a schematic of a viewer viewing a three-dimensional scene as rendered by a display of a device.

FIG. 1 is a schematic of a viewer 191 viewing a three-dimensional scene 112 as rendered by a display 110 of a device 100. Example of device 100 include head-mounted displays, mobile devices, computer monitors, and television receivers. Device 100 also includes a processor 102 and a memory 104 communicatively coupled thereto. Memory 104 stores a proxy three-dimensional data set 170 and software 130. Software 130 includes a decoder 132 in the form of machine-readable instructions, implements one or more functions of device 100. As used herein, the term "proxy image data set" denotes a memory efficient representation, or proxy, for an original image data set.

FIG. 1 also includes an encoding device 160, which includes a processor 162 and a memory 164 communicatively coupled thereto. Memory 164 stores a three-dimensional data set 150, software 166, and proxy three-dimensional data set 170. Software 166 includes an encoder 168 in the form of machine-readable instructions, implements one or more functions of encoding device 160. In embodiments, encoder 168 generates proxy three-dimensional data set 170 and a quantity P depth-plane depths 174 from three-dimensional data set 150. Device 100 and encoding device 160 are communicatively coupled via a communications network 101.

Each of memory 104 and 164 may be transitory and/or non-transitory and may include one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 104 and 164 may be integrated into processor 102 and 162, respectively.

Three-dimensional data set 150 includes a quantity S transverse cross-sectional images 152, each of which represent a respective transverse cross-section of the three-dimensional scene at a respective scene-depth 154 (0, 1, . . . . S−1). Quantity S is greater than quantity P. Proxy three-dimensional data set 170 includes P proxy images 172 (0, 1, . . . , P−1). For each depth-plane depth 174(k), encoder 168 generates a proxy image 172(k) from at least one transverse cross-sectional image 152. Index k is one P integers, e.g., an integer between and including zero and (P−1). One of the respective scene-depths 154 of the at least one transverse cross-sectional image 152 is most proximate to depth-plane depth 174(k).

Decoder 132 decodes proxy three-dimensional data set 170 and transmits decoded data to display 110, which display 110 displays as three-dimensional scene 112. Three-dimensional scene 112 includes P proxy images 172 (0, 1, . . . , P−1), each of which are at respective depth-plane depth 174 (0, 1, . . . , P−1) in a direction z and parallel to the x-y plane of a three-dimensional Cartesian coordinate system 118. On coordinate system 118, depth-plane depths 174 are denoted as $z_0, z_1, \ldots z_{P-1}$ along the z axis. FIG. 1 also depicts three-dimensional Cartesian coordinate system 198 that defines directions x' y', and z'. As viewed by viewer 191, directions x, y, and z of coordinate system 118 are parallel to respective directions x' y', and z' of coordinate system 198.

Calculating Perceptual Depths

Figure 2:
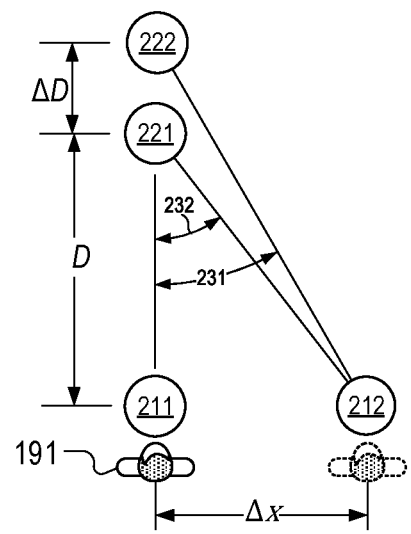
FIG. 2 is a schematic illustrating a geometrical derivation of an expression for just-noticeable-difference in depth as a function of viewing distance and a transverse displacement.

FIG. 2 is a schematic illustrating a derivation of an expression for just-noticeable-difference in depth as a function of viewing distance. In FIG. 2, an object 221 is located at distance D from viewer 191 observer and object 222 behind it by distance ΔD. From viewing position 211, object 222 is occluded by object 221. As viewer 191 moves a distance Δx to a new position 212, viewer 191 is able to observe object 222. The geometry can be written in terms of a difference Δϕ of angles 231 and 232 illustrated in FIG. 2, as shown in equation (1), where Δϕ is the angular visual acuity of the observer. For television and motion picture production, Recommendation ITU-R BT.1845 by the International Telecommunication Union specifies an observer with "normal" 20/20 visual acuity, or an angular resolution Δϕ=1/60 degree.

$$\angle 232 - \angle 231 = \Delta\phi \qquad (1)$$

Equation (1) can be written in terms of trigonometric functions as:

$$\tan^{-1}\left(\frac{\Delta x}{D}\right) - \tan^{-1}\left(\frac{\Delta x}{D + \Delta D}\right) = \Delta\phi \qquad (2)$$

Solving Equation (2) for ΔD yields equation (3), which is an example depth quantization function.

$$\Delta D = \frac{\Delta x - D \tan\left(\tan^{-1}\left(\frac{\Delta x}{D}\right) - \Delta\phi\right)}{\tan\left(\tan^{-1}\left(\frac{\Delta x}{D}\right) - \Delta\phi\right)} \qquad (3)$$

To use equation 3, a range of depth planes must be specified. Recommendation ITU-R BT.1845 specifies the closest distance where the human eye can comfortably focus as $D_{min}$=0.25 m. For $D_{max}$ we choose a value where the denominator reaches zero, and ΔD is infinity, which occurs at $$D_{max} = \frac{\Delta x}{\tan(\Delta\phi)},$$

which is dependent both on the choice of baseline distance Δx and the visual acuity Δϕ.

Figure 3:
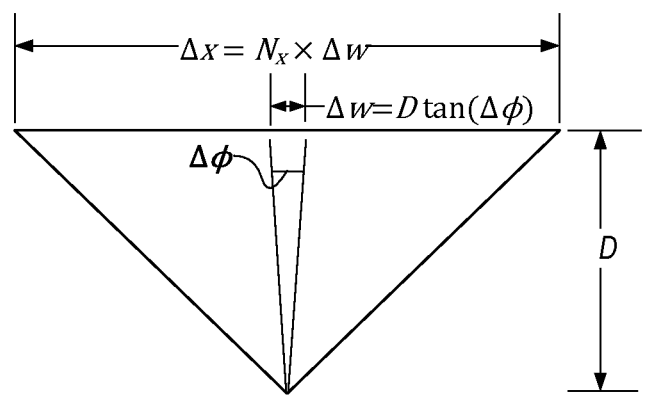
FIG. 3 is a schematic illustrating a relationship between the transverse displacement and viewing distance of FIG. 2, horizontal screen resolution, and angular visual acuity.

The value of Δx must also be specified. This is the minimum movement that an observer must make to perceive a change in depth between object 221 and object 222. For images that are intended to be viewed on a display, this can be computed from the "ideal viewing distance" specified in ITU-R BT.1845 as the point where a width Δw of each pixel matches the visual acuity Δϕ, as shown in FIG. 3. For a horizontal screen resolution of $N_x$=3840 pixels, viewing at the minimum viewing distance $D_{min}$, the distance from one edge of the screen to the other is given by equation 4:

$$\Delta x = N_x \cdot D \cdot \tan(\Delta \phi) \qquad (4)$$

Computing $\Delta x$ for the closest viewing distance $D=D_{min}$, we calculate $\Delta x=0.28$ meters, which results in $D_{max}=960$ m. Larger movements may exceed the just-noticeable difference (JND), but since it is impossible for a single observer to view from both positions simultaneously, they must rely on their working memory to compare the views from both perspectives.

Figure 4:
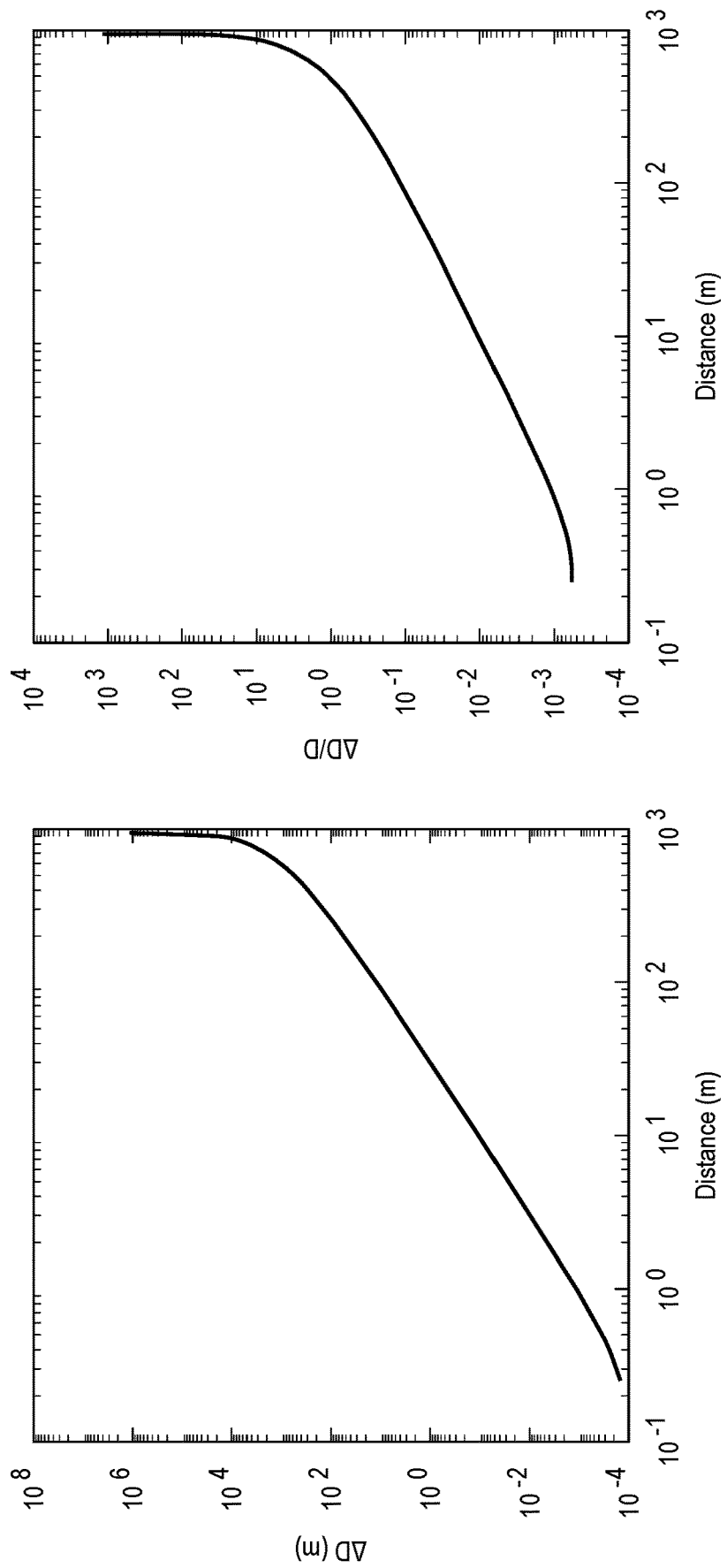
FIG. 4 is a plot of just-noticeable-difference in depth as a function of viewing distance for a specific viewing configuration.

FIG. 4 shows a plot of $\Delta D$ of equation (3) in meters and $\Delta D/D$ as a function of viewing distance $D$ for $\Delta\phi=\frac{1}{60}$ degree and $\Delta x=0.28$ meters Very small changes of depth are visible at near distances (0.15 mm at D=25 cm). The depth JND increases at larger distances until the depth approaches $D_{max}$.

Using Equation 3 starting at $D_{min}$ and incrementing by $\Delta D$ until reaching $D_{max}$ allows us to build up a table of P depth-planes depths 174, where each depth-plane depth 174 differs by a perceptual amount from the last. The final depth plane is set to $D=D_{max}$. Hence, proxy three-dimensional data set 170 is a memory efficient representation, or proxy, for three-dimensional data set 150. Computational resources required for device 100 to display and refresh views three-dimensional scene 100 as viewer 191 moves along the x' axis is less for data set 170 than for data set 150.

The number of unique depth planes under the above conditions is P=2890. To show a smooth continuous gradient spanning half of the screen (for example a railway disappearing into the distance from a bottom edge of the screen to a top edge as shown in three-dimensional scene 112) while allowing observer movement $\Delta x=0.28$ meters, nearly three thousand unique depth planes may be required.

Figure 5:
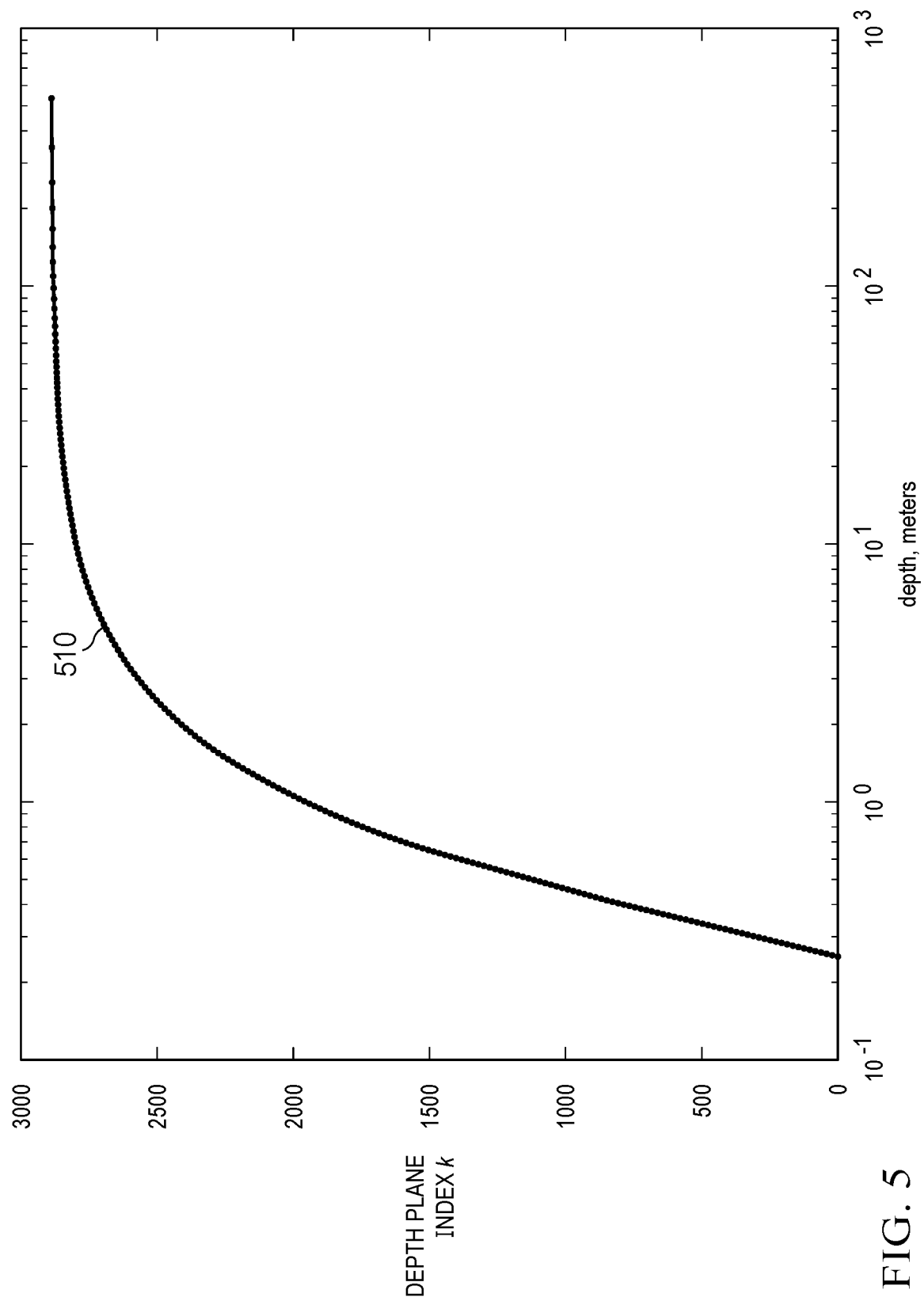
FIG. 5 is a plot showing a plurality of depth-plane depths recursively-determined using the expression for just-noticeable-difference in depth derived via FIG. 2, in an embodiment.

FIG. 5 is a plot of showing a mapping 510 of depth plane indices k=0 to k=2889 for each of the aforementioned 2890 depth planes to a respective depth-plane depth $D_k$, where $D_k$ is the depth of the $k^{th}$ depth plane.

Fitting a Functional Form

It is possible to achieve a functional fit (that is invertible) to mapping 510 that maps a plurality of actual depths D to a respective depth-plane depth $D_{PQ}$. The functional form of equation (5) is one such mapping, where depth-plane depths $D_{PQ}$ best fit mapping 510 for properly chosen values of exponent n and coefficients $c_1$, $c_2$, and $c_3$. The right hand-side of equation (5) may have other forms without departing from the scope hereof.

$$D_{PQ} = (c_2 + c_1 D'^n)/(1 + c_3 D'^n) \qquad (5)$$

In equation (5), D' is normalized depth $D/D_{max}$ and $D_{PQ}$ is a normalized depth of a corresponding perceptual depth plane. $D_{PQ}$ ranges from 0 to 1. Coefficients $c_1$, $c_2$, and $c_3$ satisfy $c_3=c_1+c_2-1$ and $c^2=-c_1(D_{min}/D_{max})^n$. In embodiments, values of $c_2$ and $c_3$ are determined such that $D_{PQ}(D_{min})=0$ and $D_{PQ}(D_{max})=1$. In an embodiment, $D_{max}$ equals 960 meters, $c_1=2,620,000$, and exponent n equals $\frac{3}{4}$.

A more accurate functional fit may be obtained using the functional form specified in equation (6), which adds an exponent m to the right side of equation (5). That is, equation (5) is a particular instance of equation (6), in which m equals one. In embodiments, exponent n=1.

$$D_{PQ} = ((c_2 + c_1 D'^n)/(1 + c_3 D'^n))^m \qquad (6)$$

As in equation (5), values of $c_2$ and $c_3$ may be determined such that $D_{PQ}(D_{min})=0$ and $D_{PQ}(D_{max})=1$. The relationships among coefficients $c_1$, $c_2$, and $c_3$ are the same as stated above for equation (5). In an embodiment, $D_{max}$ equals 960 meters, $c_1=2,620,000$, and exponent n equals 3872/4096, and m=5/4.

Depth-plane depths $D_{PQ}$ of equation (6) are an example of depth-plane depths 174. If the unit of $D_{PQ}$ is not explicitly mentioned, each depth-plane depth $D_{PQ}$ is a normalized depth ranging from zero to one. In other embodiments, each depth-plane depth $D_{PQ}$ has units of length, and ranges from $D_{min}$ to $D_{max}$.

Equation (7) is an inverted form of equation (6), and hence is an explicit expression for normalized depth $D'=D/D_{max}$ is a function of depth-plane depth $D_{PQ}$, coefficients $c_1$, $c_2$, and $c_3$, and exponents m and n.

$$D' = \left(((D_{PQ})^{1/m} - c_2)/(c_1 - c_3(D_{PQ})^{1/m})\right)^{1/n} \qquad (7)$$

Figure 6:
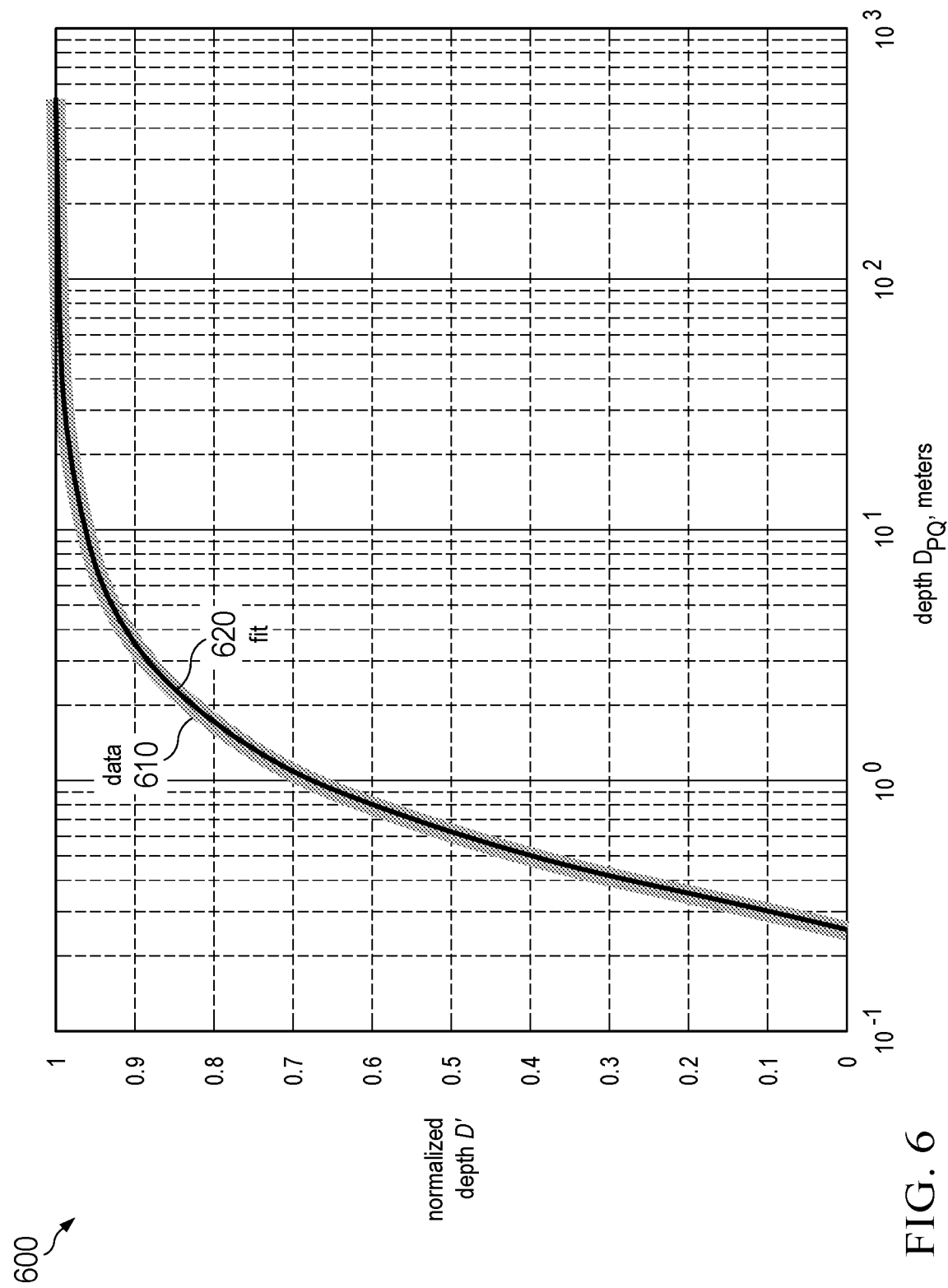
FIG. 6 is a graphical illustration of normalized depth as a function of depth-plane depths of FIG. 5, in an embodiment.

FIG. 6 is a plot 600 of equation (7). Plot 600 includes data 610 generated by an iterative and recursive application of equation (3): $D_{k+1}=D_k+\Delta D_k$, where $\Delta D_k$ is the left side of equation (3). Plot 600 also includes fit 620 generated by equation (7). In embodiments, exponent n=1, which results in an approximation of equation (7) when n≠1.

Equation (8) is an indexed version equation (7), where $k/P_d$ replaces $D_{PQ}$, $D_k$ replaces D', and index k ranges from 0 to $P_d$, where $P_d=(P-1)$. Equation (8) also includes a coefficient μ and an offset β.

$$D'_k = \mu\left(((k/P_d)^{1/m} - c_2)/(c_1 - c_3(k/P_d)^{1/m})\right)^{1/n} + \beta \qquad (8)$$

If the unit of $D'_k$ is not explicitly mentioned, β equals zero and μ equals one such that $D'_k$ represents a normalized depth $D_k/D_{max}$. In other embodiments, β and μ have units of lengths, and are chosen such that $D'_k(k=0)$ equals $D_{min}$ and $D'_k(k=P-1)$ equals $D_{max}$ and $D'_k$ is no longer normalized.

In embodiments, software 130 of device 100 includes machine readable instructions that when executed by the processor: (i) control the processor to, for each proxy image 172 (0–$P_d$), determine a respective normalized scene depth $D'_k$ according to equation (8), and (ii) display each proxy image 172 (0–$P_d$) at a scene depth determined from the normalized scene-depth $D_k$ on the display 110.

FIG. 7 is a flowchart illustrating a method 700 for representing a three-dimensional scene stored as a three-dimensional data set. In embodiments, method 700 is implemented within one or more aspects of encoding device 160 and/or device 100. For example, method 700 may be implemented by at least one of (i) processor 162 executing computer-readable instructions of software 166 and (ii) processor 102 executing computer-readable instructions of software 130. Method 700 includes steps 720 and 730. In embodiments, method 700 also includes at least one of steps 710, 740, and 750.

Step 720 includes determining a quantity P depth-plane depths along a first viewing direction relative to a first vantage point. A separation $\Delta D$ between each proximal depth D and an adjacent distal depth (D+$\Delta D$) of the P depth-plane depths is a just-noticeable difference determined by (i) the proximal depth D, (ii) a lateral offset $\Delta x$, perpendicular to the first viewing direction, and between the first vantage point and a second vantage point, and (iii) a visual angle $\Delta\phi$ subtended by separation $\Delta D$ when viewed from the second vantage point. In an example of step 720, encoder 168 determines depth-plane depths 174.

In embodiments, the visual angle $\Delta\phi$ is one arcminute. In embodiments, each of the P depth-plane depths exceeds a minimum depth $D_0$ and being denoted by $D_k$, k=0, 1, 2, . . . , (P−1), determining the P depth-plane depths comprising iteratively determining depth $D_{k+1}=D_k+\Delta D_k$. In such embodiments, separation $\Delta D_k$ may be equal to $$\frac{\Delta x - D_k \tan\left(\tan^{-1}\left(\frac{\Delta x}{D_k}\right) - \Delta\phi\right)}{\tan\left(\tan^{-1}\left(\frac{\Delta x}{D_k}\right) - \Delta\phi\right)},$$

which is an example of equation (3).

In embodiments, method 700 includes step 710, which includes determining lateral offset $\Delta x$ from the visual angle $\Delta\phi$ and a predetermined minimum depth-plane depth of the P depth-plane depths. In an example of step 710, software 166 determines lateral offset $\Delta x$ using equation (4) where D equals depth-plane depth 174(0).

Step 730 includes generating, from the three-dimensional data set, a proxy three-dimensional data set that includes P proxy images $I_k$. Generating the proxy three-dimensional data set is accomplished by, for each depth-plane depth of the P depth-plane depths: generating a proxy image of the P proxy images from at least one cross-sectional image of a plurality of transverse cross-sectional images that (i) constitute the three-dimensional data set and (ii) each represent a respective transverse cross-section of the three-dimensional scene at a respective scene-depth of a plurality of scene-depths. In embodiments, one of the respective scene-depths of the at least one cross-sectional image is most proximate to the depth-plane depth. In an example of step 730, encoder 168 generates proxy three-dimensional data set 170 from three-dimensional data set 150. Data sets 150 and 170 transverse cross-sectional images 152 and proxy images 172, respectively, as illustrated in FIG. 1.

When the at least one cross-sectional image of step 730 includes multiple cross-sectional images, step 730 may include step 732. Step 732 includes generating the proxy image comprising averaging the multiple cross-sectional images. The final depth plane may be constructed by averaging the values of all depths beyond $D_{max}$. The first depth plan may be constructed by averaging the values of all depths below $D_{min}$. In an example of step 732, encoder 168 generates each proxy image 172 as an average of two or more transverse cross-sectional images 152.

Step 740 includes, for each proxy image $I_k$ of the P proxy images, k=0, 1, 2, . . . , (P−1), determining a respective scene-depth $D_k$ of proxy image $I_k$ as a linear function of $$\left(\frac{(k/P_d)^{1/m} - c_2}{c_1 - c_3(k/P_d)^{1/m}}\right)^{1/n},$$

where m, n, $c_1$, $c_2$, and $c_3$ are predetermined values and $P_d=(P-1)$. In embodiments, each scene-depth $D_k$ equals $$\left(\frac{(k/P_d)^{1/m} - c_2}{c_1 - c_3(k/P_d)^{1/m}}\right)^{1/n}.$$

In an example of step 740, either encoder 168 or decoder 132 determines, for each proxy image 172(k), a respective depth-plane depth 174(k) according to equation (7) where $D_{PQ}$ equals $k/P_d$ and depth-plane depth 174(k) equals scene-depth $D_k$.

In embodiments, step 740 includes reading the quantities $D_{min}$, $D_{max}$, and P from metadata of the three-dimensional data set. For example, quantities $D_{min}$, $D_{max}$, and P may be stored as metadata of three-dimensional data set 150, which is read by software 166. In embodiments, each of $D_{min}$ and $D_{max}$ is a 10-bit fixed-point value, with respective values of 0.25 meters and 960 meters if the fixed-point value is zero. In embodiments, P is a 12-bit fixed-point value.

Step 750 includes each displaying proxy image/k at its respective depth-plane depth. In an example of step 750, device 100 displays at least one proxy image 172(k) at depth-plane depth 174(k), shown within three-dimensional scene 112 as $z_k$. When method 700 includes step 740, each respective depth-plane depth of step 750 equals a respective scene depth $D'_k$ of step 740, for example, depth-plane depth 174(k) equals scene-depth $D'_k$.

In embodiments, steps 720 and 730 are executed by a first device, such as encoding device 160, FIG. 1, and method 700 includes step 740. In such embodiments, step 750 may include step 752, which includes transmitting the proxy three-dimensional data from the first device to a second device, which executes said determining the respective scene-depths $D_k$ and displays the proxy image. In an example of step 752, encoding device 160 transmits proxy three-dimensional data set 170 to device 100 and neither generates nor stores depth-plane depths 174. In this example, device 100 executes step 740 to determine depth-plane depths 174.

Figure 8:
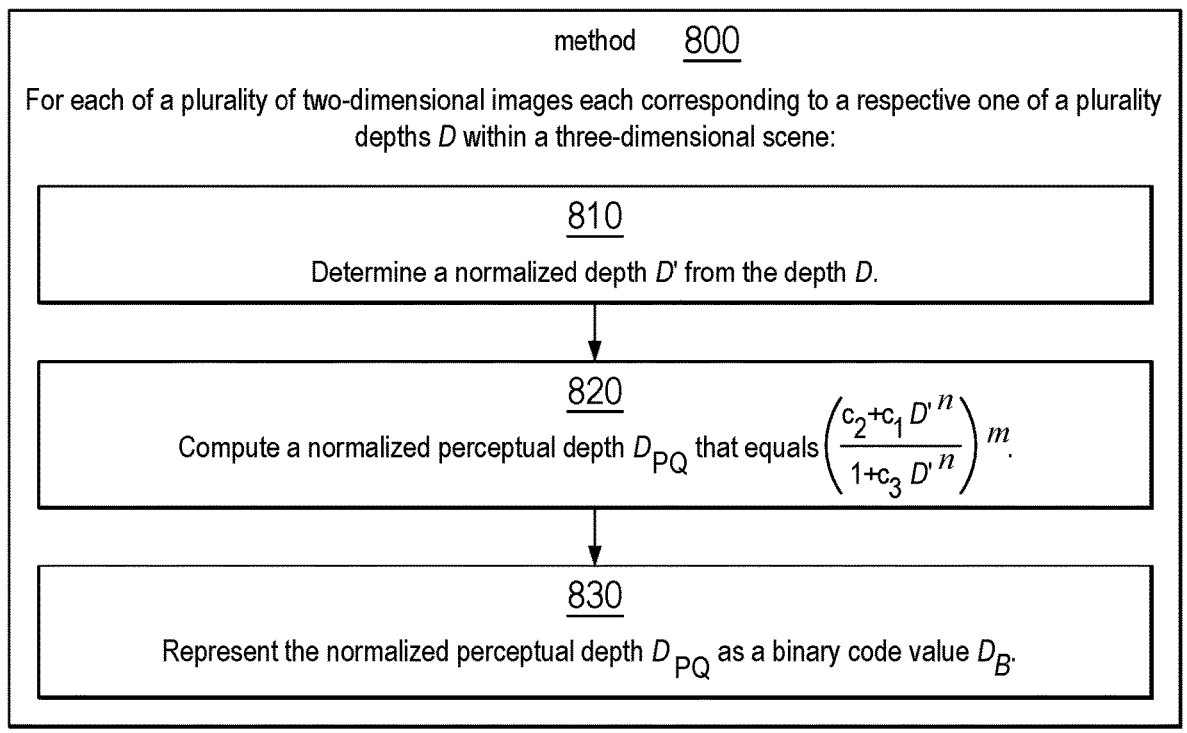
FIG. 8 is a flowchart illustrating a method for representing depth-plane data, in an embodiment.

FIG. 8 is a flowchart illustrating a method 800 for representing depth-plane data. In embodiments, method 700 is implemented within one or more aspects of device 100. For example, method 800 may be implemented by processor 102 executing computer-readable instructions of software 130.

Method 800 includes steps 810, 820, and 830, each of which are executed for each of a plurality of two-dimensional images each corresponding to a respective one of a plurality of depths D within a three-dimensional scene. In embodiments, transverse cross-sectional images 152 constitute the plurality of two-dimensional images and scene-depths 154 constitute the plurality of scene depths D.

Step 810 includes determining a normalized depth D' from the depth D. In an example of step 810, software 130 determines a respective normalized depth from each scene-depth 154.

Step 820 includes computing a normalized perceptual depth $D_{PQ}$ according to equation (6). In example of step 820, software 130 determines a respective depth-plane depth 174 from each scene-depth 154 divided by $D_{max}$. In this example, depth-plane depths are normalized depths.

Step 830 includes representing the normalized perceptual depth $D_{PQ}$ as a binary code value $D_B$. In an example of step 830, software 130 represents each depth plane-depth 174 as a respective binary code value. In embodiments, the bit depth of the binary code value $D_B$ is one of eight, ten, or twelve. Step 830 may also include storing each binary code value on a non-transitory storage media, which may be part of memory 104.

Combinations of Features

Features described above as well as those claimed below may be combined in various ways without departing from the scope hereof. The following enumerated examples illustrate some possible, non-limiting combinations.

(A1) A method for representing a three-dimensional scene stored as a three-dimensional data set is disclosed. The method includes determining a quantity P depth-plane depths along a first viewing direction relative to a first vantage point. A separation $\Delta D$ between each proximal depth D and an adjacent distal depth $(D+\Delta D)$ of the P depth-plane depths is a just-noticeable difference determined by (i) the proximal depth D, (ii) a lateral offset $\Delta x$, perpendicular to the first viewing direction, and between the first vantage point and a second vantage point, and (iii) a visual angle $\Delta \phi$ subtended by separation $\Delta D$ when viewed from the second vantage point. The method also includes generating, from the three-dimensional data set, a proxy three-dimensional data set that includes P proxy images $I_k$. Generating the proxy three-dimensional data set is accomplished by, for each depth-plane depth of the P depth-plane depths: generating a proxy image of the P proxy images from at least one cross-sectional image of a plurality of transverse cross-sectional images that (i) constitute the three-dimensional data set and (ii) each represent a respective transverse cross-section of the three-dimensional scene at a respective scene-depth of a plurality of scene-depths.

(A2) In embodiments of method (A1), the visual angle $\Delta \phi$ is one arcminute.

(A3) Embodiments of either of methods (A1) and (A2) further include determining lateral offset $\Delta x$ from the visual angle $\Delta \phi$ and a predetermined minimum depth-plane depth of the P depth-plane depths.

(A4) In embodiments of any one of methods (A1)-(A3), each of the P depth-plane depths exceeding a minimum depth Do and is denoted by $D_k$, k=0, 1, 2, . . . , (P−1), and determining the P depth-plane depths includes iteratively determining depth $D_{k+1}=D_k+\Delta D_k$.

(A5) In embodiments of method (A4), separation $\Delta D_k$ is equal to $$\frac{\Delta x - D_k \tan\left(\tan^{-1}\left(\frac{\Delta x}{D_k}\right) - \Delta\phi\right)}{\tan\left(\tan^{-1}\left(\frac{\Delta x}{D_k}\right) - \Delta\phi\right)}.$$

(A6) In embodiments of any one of claims (A1)-(A5), when generating the proxy image, the at least one cross-sectional image includes multiple cross-sectional images of the plurality of transverse cross-sectional images, and generating the proxy image includes averaging the multiple cross-sectional images.

(A7) Embodiments of any one of claims (A1)-(A6) further include for each proxy image $I_k$ of the P proxy images, k=0, 1, 2, . . . , (P−1): determining a respective scene-depth $D_k$ of proxy image $I_k$ as a linear function of $$\left(\frac{(k/P_d)^{1/m} - c_2}{c_1 - c_3(k/P_d)^{1/m}}\right)^{1/n},$$

where m, n, $c_1$, $c_2$, and $c_3$ are predetermined values and $P_d=(P-1)$; displaying proxy image $I_k$ at scene-depth $D_k$.

(A8) When said determining the P depth-plane depths and generating the proxy three-dimensional data set is executed by a first device, embodiments of (A7) further include transmitting the proxy three-dimensional data from the first device to a second device, which executes said determining the respective scene-depths $D_k$ and displays the proxy image.

(A9) In embodiments of either one of methods (A7) and (A8), each scene-depth $D'_k$ being equal to $$\left(\frac{(k/P_d)^{1/m} - c_2}{c_1 - c_3(k/P_d)^{1/m}}\right)^{1/n},$$

and the P uniformly-spaced depth-plane depths range from zero to one, where $c_3=c_1+c_2-1$ and $c_2=-c_1(D_{min}/D_{max})^n$ where $D_{min}$ and $D_{max}$ are a minimum scene-depth and a maximum scene-depth of the a three-dimensional scene, respectively.

(A10) Embodiments of (A9) further include reading the quantities $D_{min}$, $D_{max}$, and P from metadata of the three-dimensional data set.

(A11) In embodiments of either of methods (A9) and (A10), $D_{min}$ and $D_{max}$ equal to 0.25 meters and 960 meters, respectively.

(A12) In embodiments of any one of methods (A7)-(A11), $c_1$, m, and n equal to 2620000, 5/4, and 3845/4096, respectively.

(A13) In embodiments of any one of methods (A1)-(A12), in said step of generating a proxy image, one of the respective scene-depths of the at least one cross-sectional image is most proximate to the depth-plane depth.

(B1) An encoder includes a processor and a memory. The memory stores machine readable instructions that when executed by the processor, control the processor to execute any one of methods (A1)-(A13).

(C1) A display device includes an electronic visual display, a processor, and a memory. The memory stores machine readable instructions that when executed by the processor, control the processor to, for each proxy image $I_k$ of P proxy images, k=0, 1, . . . , (P−1): (i) determine a respective scene-depth $D_k$ of proxy image $I_k$ as a linear function of $$\left(\frac{(k/P_d)^{1/m} - c_2}{c_1 - c_3(k/P_d)^{1/m}}\right)^{1/n},$$

where m, n, $c_1$, $c_2$, and $c_3$ are predetermined values and $P_d=(P-1)$, and (ii) display proxy image $I_k$ at scene depth $D_k$ on the electronic visual display.

(D1) A method for representing depth-plane data includes, for each of a plurality of two-dimensional images each corresponding to a respective one of a plurality of depths D within a three-dimensional scene: (i) determining a normalized depth D' from the depth D; (ii) computing a normalized perceptual depth $D_{PQ}$ that equals $$\left(\frac{c_2 + c_1 D'^n}{1 + c_3 D'^n}\right)^m;$$

(iii) representing the normalized perceptual depth $D_{PQ}$ as a binary code value $D_B$, where m, n, $c_1$, $c_2$, and $c_3$ are predetermined values.

(D2) In embodiments of method (D1), the plurality of depths D range from a minimum $D_{min}$ at which $D_{PQ}$ equals zero to a maximum $D_{max}$ at which $D_{PQ}$ equals one, $c_2$ being equal to $-c_1 (D_{min}/D_{max})^n$, $c_3$ being equal to $(c_1+c_2-1)$.

(D3) In embodiments of either one of methods (D1) and (D2), $c_1$ equals 2,620,000, n equals 3872/4096, and m equals 5/4.

(D4) In embodiments of any one of methods (D1)-(D3), a bit depth of the binary code value $D_B$ is one of eight, ten, or twelve.

(D5) Embodiments of any one of methods (D1)-(D4) further include storing the binary code value $D_B$ on a non-transitory storage media.

(E1) An apparatus includes a non-transitory storage media and a bitstream stored on the non-transitory storage media. The bitstream includes depth-distance data, wherein the depth-distance data is encoded with binary code values $D_B$ that represent a normalized depth-distance values D' based at least in part on a functional model of $$D' = \left( \frac{(D_{PQ})^{1/m} - c_2}{c_1 - c_3 (D_{PQ})^{1/m}} \right)^{1/n}.$$

Parameters n, m, $c_1$, $c_2$, and $c_3$ are predetermined values, and $D_{PQ}$ is a normalized value of binary code value $D_B$, and satisfies $0 \leq D_{PQ} \leq 1$.

(F1) A decoding method includes, for each proxy image $I_k$ of a quantity P proxy images, k=0, 1, 2, ..., (P−1): (i) determining a respective scene-depth $D_k$ of proxy image $I_k$ as a linear function of $$\left( \frac{(k/P_d)^{1/m} - c_2}{c_1 - c_3 (k/P_d)^{1/m}} \right)^{1/n},$$

where m, n, $c_1$, $c_2$, and $c_3$ are predetermined values and $P_d = (P-1)$; and (ii) displaying proxy image $I_k$ at scene-depth $D_k$.

(F2) In embodiments of method (F1), each scene-depth $D_k$ being equal to $$\left( \frac{(k/P_d)^{1/m} - c_2}{c_1 - c_3 (k/P_d)^{1/m}} \right)^{1/n},$$

and the P uniformly-spaced depth-plane depths range from zero to one, where $c_3 = c_1 + c_2 - 1$ and $c_2 = -c_1 (D_{min}/D_{max})^n$ where $D_{min}$ and $D_{max}$ are a minimum scene-depth and a maximum scene-depth of the a three-dimensional scene, respectively.

(F3) Embodiments of either one of methods (F1) and (F2) further includes reading the quantities $D_{min}$, $D_{max}$, and P from metadata of the three-dimensional data set.

(F4) In embodiments of any one of methods (F1)-(F3), $D_{min}$ and $D_{max}$ equal to 0.25 meters and 960 meters, respectively.

(F5) In embodiments of any one of methods (F1)-(F4), $c_1$, m, and n equal to 2620000, 5/4, and 3845/4096, respectively.

(G1) An encoder includes a processor and a memory. The memory stores machine readable instructions that when executed by the processor, control the processor to execute any one of methods (F1)-(F5).

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

The invention claimed is:

1. A method for reducing the number of depth planes of a three-dimensional scene stored as a three-dimensional data set, comprising:

receiving a lateral offset Δx, perpendicular to a first viewing direction, and between a first vantage point and a second vantage point, wherein the lateral offset Δx is the minimum distance an observer must make to perceive a change in depth between a first object at a proximal depth D along the first viewing direction and a second object at an adjacent distal depth (D+ΔD) along the first viewing direction;

receiving a visual angle Δϕ representing an angular visual acuity of the observer;

receiving the three-dimensional data set that includes a quantity S transverse cross-sectional images, each of which corresponding to a depth-plane depth and representing a respective transverse cross-section of the three-dimensional scene at a respective scene-depth along the first viewing direction relative to the first vantage point;

determining a quantity P depth-plane depths along the first viewing direction relative to the first vantage point, a separation ΔD between each proximal depth D and the adjacent distal depth (D+ΔD) of the P depth-plane depths being a just-noticeable difference determined by (i) the proximal depth D, (ii) the lateral offset Δx, and (iii) the visual angle Δϕ subtended by separation ΔD when viewed from the second vantage point, wherein the quantity P is smaller than the quantity S, wherein $$\Delta D = \frac{\Delta x - D \tan\left(\tan^{-1}\left(\frac{\Delta x}{D}\right) - \Delta\phi\right)}{\tan\left(\tan^{-1}\left(\frac{\Delta x}{D}\right) - \Delta\phi\right)};$$

generating, from the received three-dimensional data set, a proxy three-dimensional data set that includes P proxy images by, for each depth-plane depth of the P depth-plane depths:

generating a proxy image of the P proxy images from at least one cross-sectional image of the quantity S transverse cross-sectional images.

2. The method of claim 1, wherein receiving the lateral offset Δx comprises determining lateral offset Δx by calculating $\Delta x = N_x \cdot D_{min} \cdot \tan(\Delta\phi)$, where $N_x$ is a horizontal screen resolution and $D_{min}$ is a predetermined minimum depth-plane depth of the P depth-plane depths.

3. The method of claim 1, wherein generating a proxy image from at least one cross-sectional image of the quantity S transverse cross-sectional images comprises generating the proxy image from multiple cross-sectional images of the quantity S transverse cross-sectional images, and wherein generating the proxy image comprises averaging the multiple cross-sectional images.

4. The method of claim 1, wherein generating a proxy image from at least one cross-sectional image of the quantity S transverse cross-sectional images comprises generating the proxy image from the at least one cross-sectional image being most proximate to the respective depth-plane depth.

5. The method of claim 1, each of the P depth-plane depths being greater or equal a predetermined minimum depth-plane depth $D_{min}$ and being denoted by $D_k$, k=0, 1, 2, ..., (P−1), determining the P depth-plane depths comprising iteratively determining depth $D_{k+1}=D_k+\Delta D_k$.

6. The method of claim 5, separation $\Delta D_k$ being equal to $$\frac{\Delta x - D_k \tan\left(\tan^{-1}\left(\frac{\Delta x}{D_k}\right) - \Delta\phi\right)}{\tan\left(\tan^{-1}\left(\frac{\Delta x}{D_k}\right) - \Delta\phi\right)}.$$

7. The method of claim 1, further comprising, for each proxy image $I_k$ of the P proxy images, k=0, 1, 2, ..., (P−1):
determining a respective approximated normalized depth-plane depth $D_k'$ of proxy image $I_k$ as a linear function of $$\left(\frac{(k/P_d)^{1/m} - c_2}{c_1 - c_3(k/P_d)^{1/m}}\right)^{1/n},$$

where m, n, $c_1$, $c_2$, and $c_3$ are selected such that each approximated normalized depth-plane depth $D_k'$ is an approximation of the normalized value of the corresponding depth-plane depth $D_k$ as determined according to the method of claim 5 or claim 6, and where $P_d=(P-1)$ and $k/P_d$ represents a discrete representation of the normalized perceptual depth $D_{PQ}$;
displaying proxy image $I_k$ at a depth-plane depth determined from the approximated normalized depth-plane depth $D_k'$.

8. The method of claim 7, said determining the P depth-plane depths and generating the proxy three-dimensional data set being executed by a first device, further comprising:
transmitting the proxy three-dimensional data from the first device to a second device, which executes said determining the respective approximated normalized depth-plane depths $D_k'$ and displays the proxy image.

9. The method of claim 7, the P uniformly-spaced normalized depth-plane depths range from zero to one, where $c_3=c_1+c_2-1$ and $c_2=-c_1(D_{min}/D_{max})^n$ where $D_{min}$ and $D_{max}$ are a minimum scene-depth and a maximum scene-depth of the a three-dimensional scene, respectively.

10. An apparatus comprising:
a processor; and
a memory storing machine readable instructions that when executed by the processor, control the processor to perform the method of claim 1.

11. A display device comprising,
an electronic visual display;
a processor; and
a memory storing machine readable instructions that when executed by the processor, control the processor to perform the method of claim 1 and to display the generated proxy images on the electronic visual display.

12. The method of claim 9, further comprising:
receiving a minimum scene-depth $D_{min}$;
receiving a maximum scene-depth $D_{max}$;
for each of a plurality of two-dimensional images each corresponding to a respective one of a plurality of scene-depths D within the three-dimensional scene:
determining a normalized depth D' from the scene-depth D by calculating $D/D_{max}$;
computing a normalized perceptual depth $D_{PQ}$ that equals $$\left(\frac{c_2 + c_1 D'^n}{1 + c_3 D'^n}\right)^m;$$

and
representing the normalized perceptual depth $D_{PQ}$ as a binary code value $D_B$.

13. The method of claim 12, further comprising storing the binary code value $D_B$ on a non-transitory storage media.

14. The method of claim 9, further comprising:
for each of a plurality of two-dimensional images each corresponding to a respective one of a plurality of normalized perceptual depths $D_{PQ}$ within the three-dimensional scene:
computing a normalized depth-distance value D' as a linear function of $$\left(\frac{(D_{PQ})^{1/m} - c_2}{c_1 - c_3(D_{PQ})^{1/m}}\right)^{1/n},$$

where $D_{PQ}$ is a normalized value and satisfies $0 \leq D_{PQ} \leq 1$.

15. An apparatus comprising: a non-transitory storage media; and a bitstream stored on the non-transitory storage media, the bitstream comprising depth-distance data, wherein the depth-distance data is encoded with binary code values $D_B$ that represent normalized depth-distance values D' determined according to the method of claim 14.

* * * * *